(12) United States Patent
Loew et al.

(10) Patent No.: US 7,708,304 B2
(45) Date of Patent: May 4, 2010

(54) AIRBAG ASSEMBLY

(75) Inventors: Jean-Philippe Loew, Novil, MI (US); Kenneth John Kwasnik, Portage, MI (US)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 10 days.

(21) Appl. No.: 10/581,772

(22) PCT Filed: Feb. 14, 2005

(86) PCT No.: PCT/EP2005/001364

§ 371 (c)(1),
(2), (4) Date: Oct. 24, 2006

(87) PCT Pub. No.: WO2005/077718

PCT Pub. Date: Aug. 25, 2005

(65) Prior Publication Data

US 2007/0108739 A1    May 17, 2007

Related U.S. Application Data

(60) Provisional application No. 60/545,707, filed on Feb. 17, 2004.

(51) Int. Cl.
*B60R 21/217* (2006.01)
(52) U.S. Cl. .................................. 280/728.2
(58) Field of Classification Search ............. 280/728.2, 280/730.1, 730.2, 731, 732, 751–753
See application file for complete search history.

(56) References Cited

U.S. PATENT DOCUMENTS

| | | | |
|---|---|---|---|
| 3,768,824 A * | 10/1973 | Kloppe et al. ............... | 280/731 |
| 5,058,921 A * | 10/1991 | Cuevas ....................... | 280/741 |
| 5,127,669 A * | 7/1992 | Suran et al. ................. | 280/732 |
| 5,145,207 A * | 9/1992 | Bederka et al. ............. | 280/732 |
| 5,211,421 A * | 5/1993 | Catron et al. ............ | 280/728.2 |
| 5,242,192 A * | 9/1993 | Prescaro et al. .......... | 280/730.1 |
| 5,346,248 A * | 9/1994 | Rhein et al. .............. | 280/728.1 |
| 5,360,231 A | 11/1994 | Adams | |
| 5,364,124 A * | 11/1994 | Donegan et al. ......... | 280/730.1 |
| 5,385,366 A | 1/1995 | Frank et al. | |

(Continued)

FOREIGN PATENT DOCUMENTS

EP        688700 A    12/1995

(Continued)

OTHER PUBLICATIONS

European Office action dated: May 5, 2007 for corresponding International Application 05715294.4.-1523.

(Continued)

*Primary Examiner*—Paul N Dickson
*Assistant Examiner*—Robert A Coker
(74) *Attorney, Agent, or Firm*—Matthew B. Dernier, Esq.; Gibson & Dernier LLP

(57) ABSTRACT

The present invention relates to an airbag assembly comprising: a folded airbag adapted to be inflated and deployed into a passenger compartment upon detection of a collision, a chute for guiding the airbag when it is inflated, the chute extending between the folded airbag and a deployment opening, wherein the chute widens into a side direction.

11 Claims, 4 Drawing Sheets

U.S. PATENT DOCUMENTS

| | | | | |
|---|---|---|---|---|
| 5,398,959 A | * | 3/1995 | Avila | 280/728.3 |
| 5,433,472 A | * | 7/1995 | Green et al. | 280/728.2 |
| 5,498,030 A | * | 3/1996 | Hill et al. | 280/743.1 |
| 5,580,081 A | | 12/1996 | Berg | |
| 5,762,367 A | * | 6/1998 | Wolanin | 280/736 |
| 6,022,043 A | * | 2/2000 | Harnisch et al. | 280/728.2 |
| 6,685,217 B2 | * | 2/2004 | Abe | 280/730.1 |
| 6,789,816 B2 | * | 9/2004 | Mar et al. | 280/728.3 |

FOREIGN PATENT DOCUMENTS

| | | |
|---|---|---|
| EP | 719679 A | 7/1996 |
| EP | 719679 A2 * | 7/1996 |
| JP | 05345555 A * | 12/1993 |

OTHER PUBLICATIONS

European Office action dated: Dec. 22, 2006 for corresponding International Application 05715294.4-1523.

\* cited by examiner ed to designate like parts in the Figs.

AIRBAG ASSEMBLY

BACKGROUND OF THE INVENTION

The present invention relates to the field of airbag safety systems, and more particularly to an airbag assembly.

Airbag safety systems have come into widespread use in automotive vehicles and trucks. For example, a modern car can have various airbags, such as a driver airbag, passenger airbag, knee airbags, side airbags and/or other airbags.

Such airbag systems comprise an inflatable cushion, commonly referred to as an 'airbag' which is stored folded in a storage receptacle and then very rapidly inflated, as with gas from a pyrotechnic gas generator, when a collision of the vehicle is detected by sensors. The airbag is thereby deployed in a position to absorb the impact of the driver or a passenger.

One or more airbag deployment doors normally overlie the airbag receptacle and are forced open when the airbag is inflated to allow deployment of the airbag through the opening created by the door panel movement.

It is critical that the airbag deploys within milliseconds of activation of the airbag system in order to protect the occupant. However, the inflating airbag can exercise a considerable force onto the occupant. This causes a concern for child safety when the airbag deploys into a forward facing child safety seat. In such instances, the airbag may cause considerable harm or even death to the front facing child.

To prevent such harm some prior art airbag safety systems have an airbag deactivation switch. By means of the airbag deactivation switch the airbag safety system can be switched off in order to prevent deployment of the airbag when a collision is detected. This allows placing a child in front of an airbag. However, there is still a residual risk in case the driver has inadvertently forgotten to switch off the airbag system when the child is placed in front of the airbag. Another risk of such systems is that the airbag needs to be reactivated when an adult is placed in front of the airbag which may also be forgotten by the driver.

U.S. Pat. No. 6,846,012 shows a child seat sensor assembly. Upon sensing the presence of a child seat, a control signal is sent to the vehicle control system in order to limit or prevent deployment of the airbag. However, this system requires a special child safety seat.

The invention aims to provide an improved airbag assembly that reduces the maximum force impaled to an occupant in order to reduce the risk of injury, especially when the occupant is a child.

SUMMARY OF THE INVENTION

In accordance with the present invention there is provided an airbag assembly comprising a folded airbag adapted to be inflated and deployed into a passenger compartment upon detection of a collision, a chute for guiding the airbag when it is inflated, the chute extending between the folded airbag and a deployment opening, wherein the chute widens into a side direction.

The widening of the chute into a side direction has the effect that the airbag is filled out at its sides ahead of its middle region when it is deployed into the passenger compartment. By pushing the airbag to an outer area, the maximum force onto an occupant located directly in front of the airbag is reduced, thus reducing the risk of injury. The reduction of the maximum force allows placing a child in front of the airbag.

In accordance with an embodiment of the invention the chute has at least one sloped sidewall. For example, the chute has a top wall, a bottom wall and left and right sidewalls. In this instance at least the left or the right sidewall is sloped. For example, both the left and the right sidewalls are sloped with the same or a different slope angle. In addition the top and/or bottom sidewalls can also be sloped with the same or a different slope angle than the left and/or right sidewalls.

In accordance with an embodiment of the invention the sloped angle of the at least one sloped sidewall is between 20° and 70°. Preferably the slope angle is approximately 45°.

The at least one sloped sidewall has the effect that the gas flow streaming into the airbag when it is deployed into the passenger compartment is directed such that the sides of the airbag are filled out ahead of the middle region of the airbag.

In accordance with a preferred embodiment of the invention, the sloped sidewalls of the chute form a V-shape.

In accordance with an embodiment of the invention at least one of the sloped sidewalls of the chute has a convex surface or a concave surface.

In accordance with an embodiment of the invention the chute is funnel-shaped.

The present invention can be used for various kinds of airbags, such as driver airbags, passenger airbags, knee airbags, side airbags and other airbag safety systems.

BRIEF DESCRIPTION OF THE DRAWINGS

In the following preferred embodiments of the invention will be explained in greater detail by way of example only making reference to the drawings in which.

DETAILED DESCRIPTION OF THE INVENTION

Figure 1:
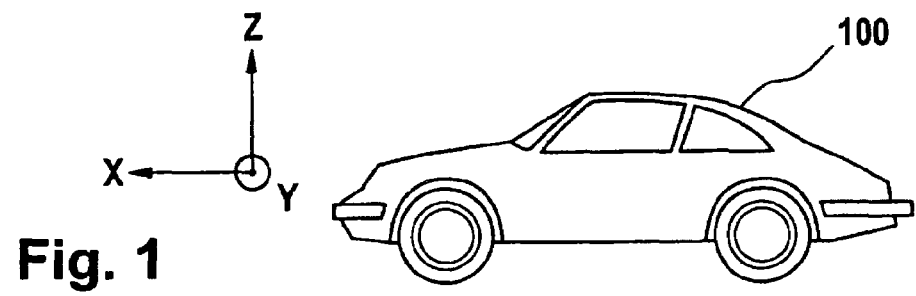
FIG. 1 shows a side view of an automotive vehicle.

FIG. 1 shows a side view of an automotive vehicle 100. The automotive vehicle 100 defines a coordinate system, i.e. a forward or x-direction, a side or y-direction and a vertical or z-direction as shown in the coordinate system depicted in FIG. 1. This coordinate system is referenced throughout the following FIGS. 2 to 7. Like reference numerals are used to designate like parts in the Figs.

Figure 2:
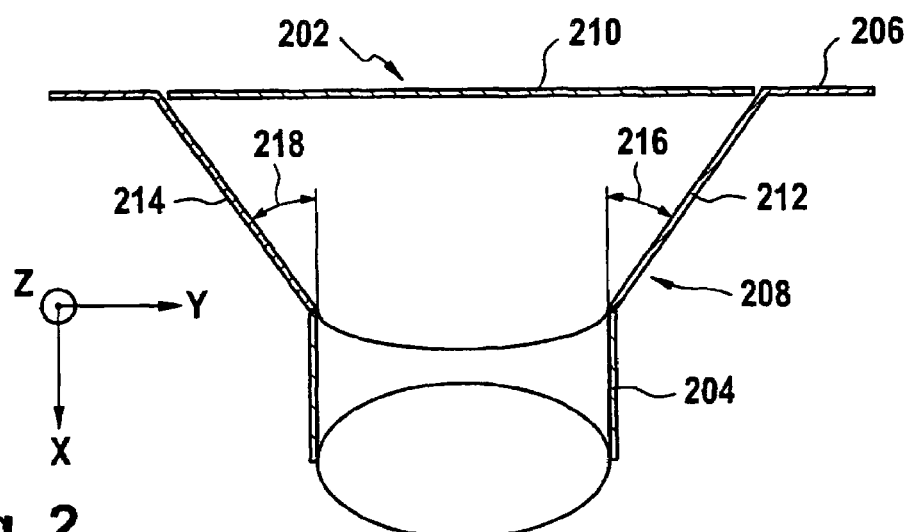
FIG. 2 shows a schematic cross-sectional view of a first embodiment of an airbag assembly of the invention.

FIG. 2 shows a schematic cross-sectional view of an airbag assembly 202 that can be mounted in automotive vehicle 100 (cf. FIG. 1). The airbag assembly 202 can be a passenger airbag, a knee airbag, a side airbag or another kind of airbag assembly.

For the purpose of ease of explanation it is assumed in the following that the airbag assembly 202 is a passenger airbag assembly.

A folded passenger airbag 204 is arranged below an instrument panel 206 in the interior of the automotive vehicle. The airbag assembly 202 operates by deploying the passenger airbag 204 which expands towards the instrument panel 206 and is guided in chute 208. The deploying airbag encounters airbag deployment door 210 and forces the airbag deployment door 210 to separate from the instrument panel 206 and open. In order for the airbag deployment door 210 to open, a weakening line, such as a groove or a perforation can be provided, such as along a portion of the perimeter of the airbag deployment door 210 as it is as such known from U.S. Pat. No. 5,744,776.

The chute 208 has (viewed into the x-direction) a left sidewall 212 and a right sidewall 214. The left sidewall 212 encloses an angle 216 with the x-direction and the right sidewall 214 encloses an angle 218 with the x-direction. Preferably both angles 216 and 218 are within the range between 20° to 70°. For example, both angles 216 and 218 are approximately 45°.

Figure 3:
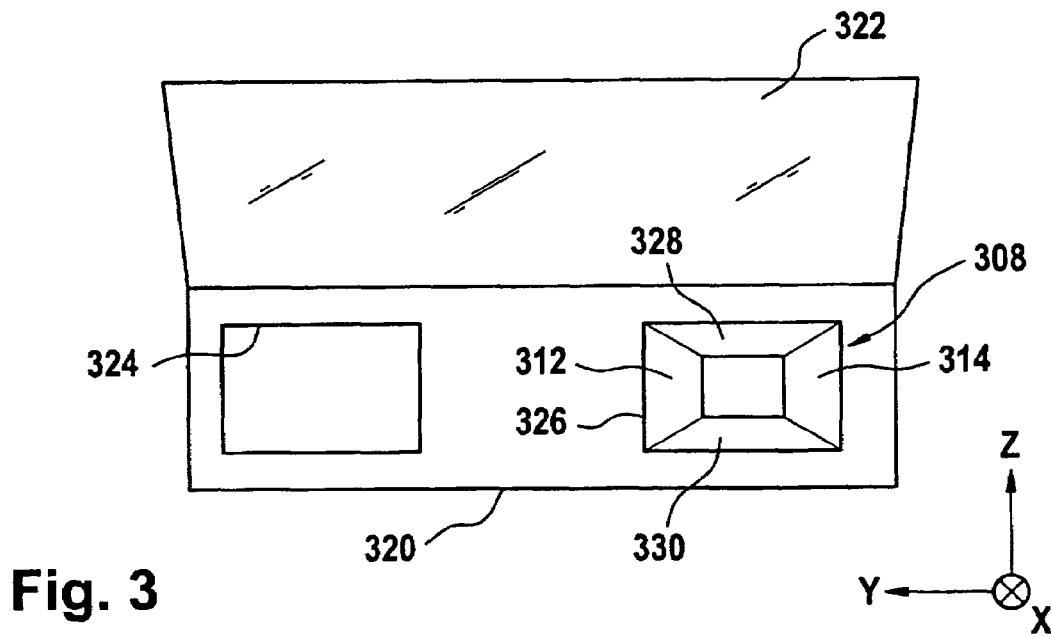
FIG. 3 shows a schematic side view of an instrument panel having a second embodiment of an airbag assembly of the invention.

FIG. 3 schematically shows an instrument panel 320 that is arranged below windshield 322 of automotive vehicle 100 (cf. FIG. 1). The instrument panel 320 has an opening 324 on the driver's side for the installation of an instrument cluster (not shown) and an airbag deployment door (not shown) of desired shape, in this case rectangular, on the passenger's side whose entire or partial perimeter is defined by a tear seam moulded or cut into the underside of the instrument panel. The tear seam is preferably invisible to the occupants of the vehicle for reasons of aesthetics.

The airbag deployment door covers an airbag deployment opening 326. An airbag chute 308 is arranged below the airbag deployment opening 326. The airbag chute 308 serves to guide an airbag when it is inflated upon detection of a collision. In other words the chute 308 transitions the space between the canister where the folded airbag is stored and the back of the airbag deployment door that covers the airbag deployment opening 326 in order to guide the deployment of the inflating airbag. When the inflating airbag hits the back of the airbag deployment door, the airbag deployment door opens and the inflating airbag deploys into the passenger compartment.

Due to the sloped left and right sidewalls 312, 314 of the chute 308 that widen the chute into the y-direction the sides of the airbag are filled out ahead of the middle region of the airbag when the inflating airbag travels along the chute 308 and deploys into the passenger compartment. In addition the upper wall 328 and the lower wall 330 of the chute 308 are also sloped in the embodiment considered here. Hence, in this embodiment the chute 308 has a V-shape both in the horizontal plane and the vertical plane.

Figure 4:
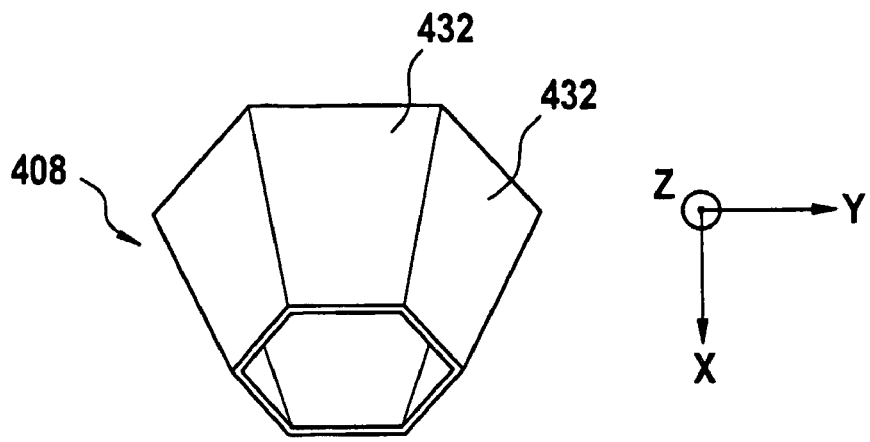
FIG. 4 shows a perspective view of a third embodiment of an airbag chute of the invention.
Figure 5:
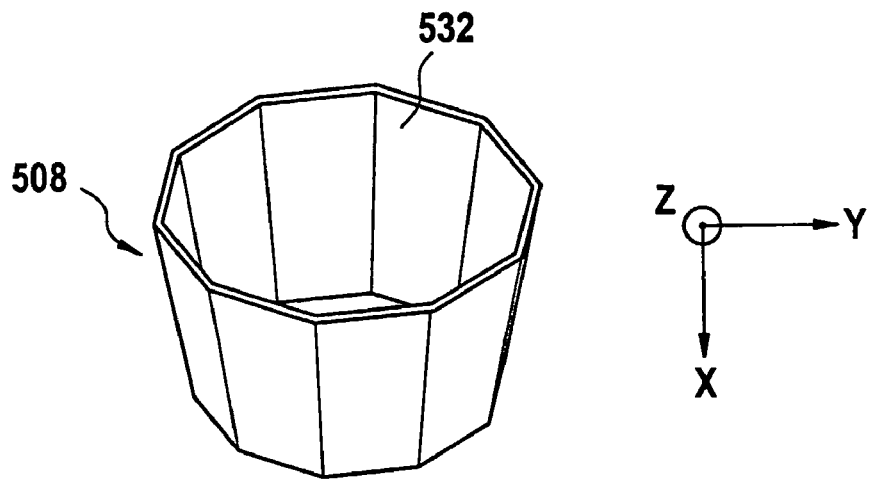
FIG. 5 shows a perspective view of a fourth embodiment of an airbag chute of the invention.
Figure 6:
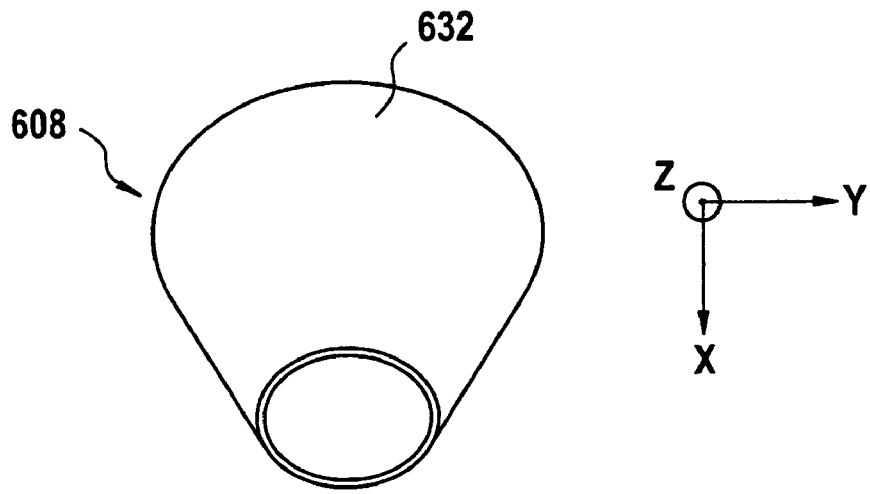
FIG. 6 shows a perspective view of a fifth embodiment of a chute of the invention.

FIGS. 4, 5 and 6 show various embodiments of chutes of the invention that are funnel-shaped. In the embodiment of FIG. 4 the funnel-shape of the chute 408 is constituted by a number of six sloped walls 432 whereas the chute 508 has a number of ten sloped walls 532. In the embodiment of FIG. 6 the chute 608 has a conical form constituted by a single wall 632.

It is to be noted that a common feature of the funnel-shaped chutes 408, 508 and 608 of FIGS. 4, 5 and 6, respectively, is that the chutes widen into a side direction relative to the passenger that is to be positioned in front of the airbag deployment opening.

Figure 7:
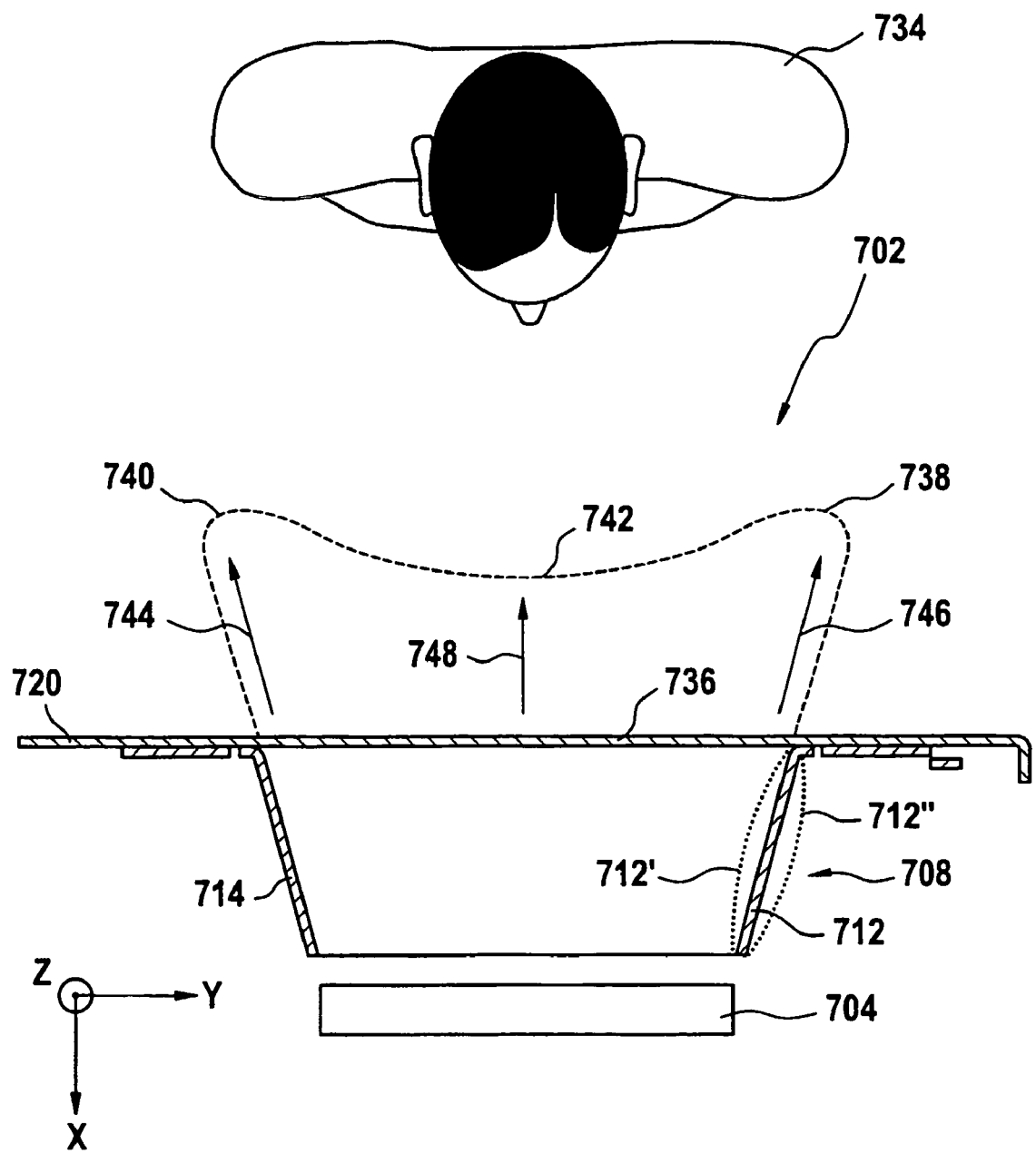
FIG. 7 shows a schematic cross-sectional view of a sixth embodiment of an airbag assembly of the invention during deployment of the airbag into a passenger compartment.

FIG. 7 shows an alternative embodiment of a passenger airbag assembly 702 of the invention. The passenger 734 is placed on the passenger seat in front of the airbag deployment opening that is covered by airbag deployment door 736. The chute 708 has sloped sidewalls 712 and 714; a folded passenger airbag 704 is located at the rear opening of the chute 708. When a collision is detected the passenger airbag is inflated and expands along the chute 708.

When the inflating passenger airbag 704 hits the airbag deployment door, the airbag deployment door 736 opens such that the passenger airbag 704 can penetrate into the passenger compartment. The dashed lines in FIG. 7 show the contour of passenger airbag 704 during its deployment into the passenger compartment towards the passenger 734. Due to the sloped sidewalls 712 and 714 of the chute 708 the side portions 738, 740 of the passenger airbag 704 are filled with a higher gas pressure than the middle region 742 of the passenger airbag 704. The direction of the expansion of the side portion 738 of the passenger airbag is indicated by arrow 746 whereas the direction of the expansion of the side portion 740 is indicated by the arrow 744. The direction of the expansion of the middle region 742 is indicated by arrow 748.

Due to the sloped sidewalls 712 and 714 the pressure built-up in the side portions 738 and 740 is more abrupt than in the middle region 742. Therefore the force with which the middle region 742 eventually hits the passenger 734 is reduced. This reduces the risk of injury of the passenger 734 and it also facilitates to place a child in front of the passenger airbag assembly 702.

The sidewall 712 and/or the sidewall 714 can have a convexe or concave shape. The doted lines in FIG. 7 show a convexe sidewall 712' and a concave sidewall 712" as alternatives to straight sidewall 712.

The chute 708 can be attached to an airbag deployment door cover, airbag module or to the instrument panel 720. The chute 708 can be designed as a separate part or integral to the airbag module, instrument panel or instrument panel structure.

Figure 8A:
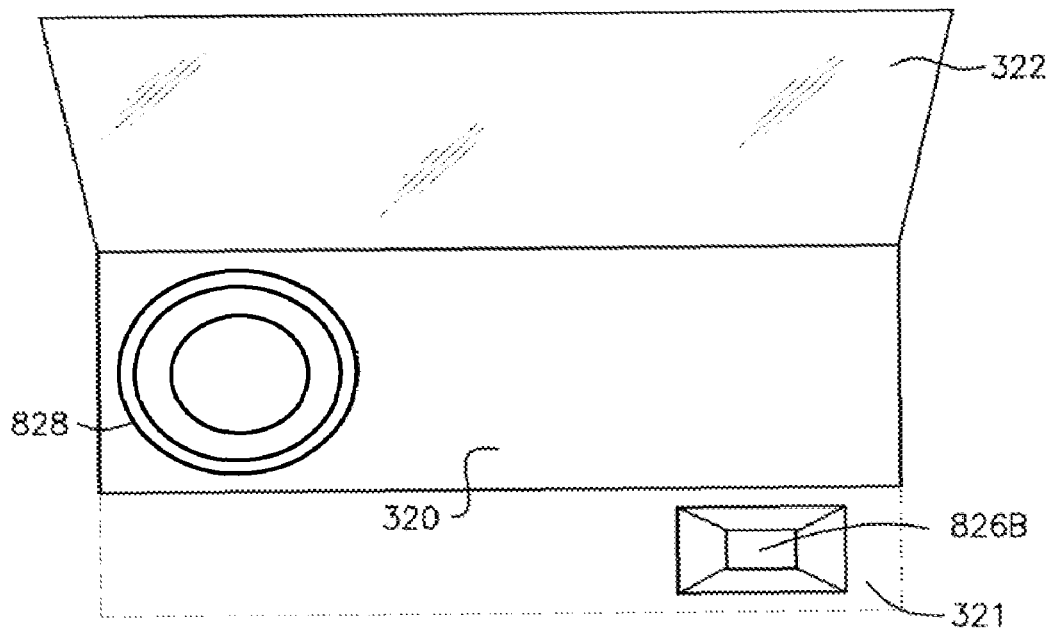
FIG. 8A shows a schematic view of an instrument panel having a further embodiment of an airbag assembly of the invention in which the airbag assembly is in a lower portion of the vehicle for a knee airbag application.
Figure 8B:
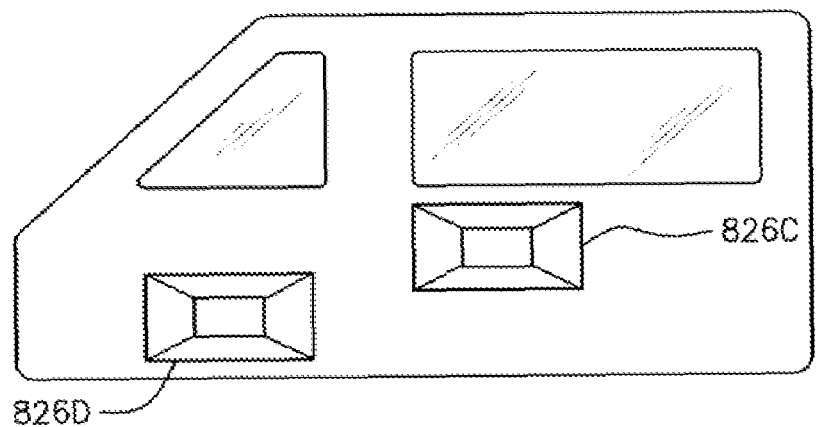
FIG. 8B shows a schematic view of an instrument panel having a further embodiment of an airbag assembly of the invention in which the airbag assembly is in the door of the vehicle for a side airbag application and/or a knee airbag application.

FIG. 8A shows a schematic view of an instrument panel 320 having a further embodiment of the present invention that provides a knee airbag. An airbag assembly 826B (similar to the assembly 202 discussed above) is located in a lower portion 321 of the vehicle for knee airbag functionality. FIG. 8B shows a schematic view of a door of a vehicle having a further embodiment of the present invention that provides a side airbag and/or a knee airbag. An airbag assembly 826C and/or 826D (similar to the assembly 202 discussed above) may be located in the door for side airbag functionality. Airbag assembly 826D may also operate as a knee airbag depending on location.

It is to be noted that the present invention is broadly applicable to various airbag designs with or without an inner door. It can be applied to either seamless or discrete airbag deployment doors. The location of the airbag assembly can be on the upper passenger side as well as the lower driver or passenger sides.

LIST OF REFERENCE NUMERALS

100 Automotive vehicle
202 Airbag assembly
204 Passenger airbag
206 Instrument panel
208 Chute
210 Airbag deployment door
212 Left sidewall
214 Right sidewall
216 Angle
218 Angle 308 Chute
312 Left sidewall
314 Right sidewall
320 Instrument panel
322 Windshield
324 Opening
326 Airbag deployment opening
328 Upper wall
330 Lower wall
408 Chute
432 Wall
508 Chute
532 Wall
608 Chute
632 Wall
702 Passenger airbag assembly
704 Passenger airbag
708 Chute
712 Sidewall
714 Sidewall
720 Instrument panel
734 Passenger
736 Airbag deployment door
738 Side portion
740 Side portion
742 Middle region
744 Arrow
746 Arrow
748 Arrow

The invention claimed is:

1. An airbag assembly comprising:
a folded airbag operable to be inflated and deployed into a passenger compartment upon detection of a collision, a chute for guiding the airbag when it is inflated, the chute extending between the folded airbag and a deployment opening, wherein the chute widens into at least one of a left side direction and a right side direction relative to a passenger that is positioned in front of the airbag deployment opening, the chute having at least one sidewall sloped in at least one of the left side direction and the right side direction,
wherein the folded airbag is located at a rear opening of the chute, the width of the rear opening equals the width of the folded airbag, and the airbag assembly is one of: a passenger airbag, a side airbag, and a knee airbag.

2. The airbag assembly of claim 1, a slope angle of the at least one sloped sidewall being between 20° and 70°.

3. The airbag assembly of claim 2, the chute having a V-shape.

4. The airbag assembly of claim 2, the chute having at least one convex surface.

5. The airbag assembly of claim 2, the chute having at least one concave surface.

6. The airbag assembly of claim 2, the chute being funnel-shaped.

7. The airbag assembly of claim 1, a slope angle of the at least one sloped sidewall being approximately 45°.

8. The airbag assembly of claim 1, the chute having a V-shape.

9. The airbag assembly of claim 1, the chute having at least one convex surface.

10. The airbag assembly of claim 1, the chute having at least one concave surface.

11. The airbag assembly of claim 1, the chute being funnel-shaped.

* * * * *